Patented Feb. 15, 1938

2,108,109

UNITED STATES PATENT OFFICE 2,108,109

MANUFACTURE OF ORGANIC COMPOUNDS

Henry Dreyfus, London, England

No Drawing. Original application August 25, 1933, Serial No. 686,737. Divided and this application September 5, 1935, Serial No. 39,285. In Great Britain September 1, 1932

7 Claims. (Cl. 260—54)

This invention relates to the manufacture of ethers of glycols, glycerol or other polyhydric alcohols, and particularly to the manufacture of ethers containing two molecules of such hydroxy compounds united by ether linkages at two or more hydroxy groups, and is a divisional of copending application, S. No. 686,737.

According to the present invention ethers of glycols, glycerol or other polyhydric alcohols are produced by subjecting the polyhydric alcohols together with metal oxides, and particularly alkali or alkaline earth metal oxides, to the action of heat. The process of the invention is preferably carried out in the presence of hydrogen chloride.

It may be remarked that the ethers formed from two molecules of ethylene glycol or two molecules of glycerol in which all the hydroxyl groups have furnished ether linkages, dioxane and diglycerol triether, possess very valuable properties, for example as solvents for organic derivatives of cellulose and that these compounds in particular may be made in a very satisfactory manner by the process of the present invention.

The polyhydric alcohols may be employed in chemical combination with the metal oxides, i. e. in the form of alcoholates such as sodium or calcium alcoholates, or may be employed simply in admixture with the metal oxides. In carrying out the process of the invention the starting material is heated, preferably in the presence of hydrogen chloride, to a suitable temperature and the ether formed may then be removed from the heating zone, for example by distillation through a column, the top of which is maintained at such a temperature that any hydroxy compound vapor is returned to the reaction zone, while the ether remains uncondensed.

When it is desired to employ the polyhydric alcohols in chemical combination in the form of alcoholates preferably alkali or alkaline earth alcoholates are used such as the sodium or calcium alcoholate of, for example, glycerol. By heating such an alcoholate in an atmosphere comprising hydrogen chloride gas the ethers, including diglycerol triether in the case of a glycerol alcoholate may be produced. Suitable temperatures are, for example, temperatures above 160° C., and especially between 180° and 200° C. although higher temperatures may be employed if desired, e. g. temperatures up to 300° C., particularly in the case where the starting material contains an excess of glycerine. Advantageously, the reaction is effected under pressures not substantially exceeding atmospheric, while if desired lower pressures, for example between ¼ and 1 atmosphere, may be employed.

Although the use of an atmosphere comprising hydrogen chloride is to be preferred, in that, inter alia, it enables somewhat lower temperatures to be employed, the invention is not restricted to such use, and the production of the ether may be effected by simple heating of the starting material, preferably in an inert atmosphere comprising, for instance, nitrogen or carbon dioxide or in an atmosphere comprising both such an inert gas and hydrogen chloride.

If desired, other substances having a catalytic or condensing action, e. g. calcium chloride, may be employed, either alone or in association with each other and/or with hydrogen chloride.

The alcoholates may very conveniently be heated, whether or not hydrogen chloride or other catalyst be employed, in solution or suspension in or otherwise in presence of an inert liquid of high boiling point, such as tetrahydronaphthalene, decahydronaphthalene, diphenyl or the like. Preferably the solution or suspension is thoroughly stirred or otherwise agitated, and, when hydrogen chloride is employed, intimate contact therewith may further be promoted by leading the gas into the reaction mixture in the form of very fine bubbles such as may be produced by forcing the gas through a porous plate. If desired the agitation of the liquid may be aided by the passage of other gases or vapors, such as nitrogen or carbon dioxide, therethrough, whether or not hydrogen chloride is employed.

Advantageously the ether produced may be removed from the reaction zone in the form of vapor as fast as it is formed, together with the escaping water vapor and hydrogen chloride gas, from which it may afterwards be separated in any convenient way. Condensation of the ether produced may be effected in presence of a substance capable of forming an azeotropic mixture with the ether, whereby the separation of the latter from the parent hydroxy compound and/or the inert solvent or diluent is facilitated. If desired, the solvent or diluent itself may be capable of entraining the ether, yielding a mixture free from the hydroxy compound from which the ether may subsequently be separated in any convenient way.

To aid in separating from the ether the water formed in the reaction, or any water initially present, a substance capable of forming an azeotropic mixture with water may be employed. Such substances may be initially present with the starting material to be subjected to the reaction, or, for instance, they may be added to the vapour mixture leaving the reaction zone, preferably before any condensation has taken place. Advantageously they may be present in amount sufficient to produce an azeotropic mixture with all the water present, thus enabling the ether to be separated, for example by fractional condensation, in an almost completely anhydrous state.

Alternatively the reaction may be effected under such conditions that the ether formed is continually returned to the reaction zone, while the water vapor, with or without an entraining liquid, is allowed to escape. Such separation may conveniently be effected in a fractionating column containing, for example Raschig rings.

As previously indicated instead of employing the polyhydric alcohols in combination in the form of alcoholates they may be employed in admixture with metal oxides, and preferably alkali metal or alkaline earth metal oxides. For example, a mixture of glycerine and calcium oxide may be heated to a suitable temperature and fresh glycerine run into the mixture as the ether distils off. Whether the polyhydric alcohol and metal oxide are in chemical combination or simply in admixture with each other the quantity of oxide present may be equal to, less than, or more than that theoretically necessary to form the salt of the polyhydric alcohol.

Although the use of azeotroping substances for the separation of water from the ethers has been specifically described, such removal may be effected in any other convenient way, either before or after condensation of both the ethers and water or of the ethers alone. Thus the vapors leaving the reaction zone may be led into or otherwise treated with a liquid at a temperature between the boiling points of water and the ether; preferably such liquid may be substantially immiscible with the ether, thus facilitating the subsequent separation of ether from condensing liquid. Again, the reaction vapors may be treated with a liquid having a solvent action on the ether and substantially none on the water, or the ether may be passed over or treated with water binding substances, preferably after separation, as by fractional condensation, of the greater part of the water. Any other convenient method may, however, be employed.

Even after separation from the water, the ethers may still contain hydrogen chloride, which may be removed in any convenient way. Thus the vapors issuing from the reaction zone, before the separation of the water, may be passed over or otherwise in contact with a neutralizing agent such as sodium carbonate or calcium hydroxide. If desired, however, neutralization may take place after condensation of the ethers or of both the ethers and water. Preferably, however, the water is first separated as described above, together with much of the hydrogen chloride, and the condensed ethers subsequently treated with a neutralizing agent. The ethers may be separated from the chlorides formed and/or excess of the neutralizing agent in any convenient way, for example by centrifuging or by distillation.

Any water present in the products of reaction may be removed in any convenient manner, as, for example, by fractional condensation, with or without the use of an entraining liquid therefor. If the decomposition of the polyhydric alcohol, as such or in the form of an alcoholate, is effected under conditions of temperature and pressure such that the ether does not distill off continuously, the water may be continuously removed by distillation, if desired, in the form of an azeotropic mixture with any suitable substance.

The ether may be separated from the solvent or diluent, if such is employed, for example with the aid of an entraining substance, or by fractional distillation, or in any other way.

The following examples illustrate the invention, but are not to be considered as limiting it in any way:—

*Example 1*

A mixture of about equal parts by weight of calcium glycerate and diphenyl is heated slowly in a vessel provided with stirrers and an outlet connected to a condenser leading to a receiver.

When the diphenyl melts the temperature is rapidly raised to 190–200° C. whilst stirring and hydrogen chloride is passed into the mixture in the form of small bubbles by means of a distributor immersed in it.

The reaction products are condensed and collected in the receiver, uncondensed hydrogen chloride being returned to the process. After neutralization with sodium carbonate, the diglycerol triether produced can be separated by distillation and/or extraction with solvents.

*Example 2*

A fluid mixture of calcium glycerate and glycerol is subjected whilst stirring to dry distillation at a temperature of 240–280° C. and the diglycerol triether evolved together with by-products is condensed and worked up as described in the preceding example.

Although the invention has been described specifically with respect to the manufacture of dioxane and diglycerol triether, it may also be applied to any similar or homologous di- or poly-ethers. Thus, for example, erythritol or other polyhydroxy compounds or mono- or other ethers thereof containing at least two free hydroxyl groups may be converted into the corresponding ethers. Moreover, the invention is not confined to the production of symmetrical ethers; thus, for example, by using a mixture of glycol and glycerol, or glycol and an α-ether of glycerol, hydroxy methyl dioxane or ethers thereof may be obtained, or by employing glycol and a β-ether of glycerol, a compound containing a 7-membered ring may be obtained. Again, instead of employing only polyhydric alcohols such compounds may be employed together with, for example, formaldehyde, acetaldehyde, acetone or homologues thereof, and the like, so as to produce products of condensation between the formaldehyde etc. and the polyhydric alcohols as well as the polyhydric alcohol-ethers. By this means mixtures having very valuable solvent powers may be produced.

What I claim and desire to secure by Letters Patent is:—

1. Process for the manufacture of a cyclic ether, which comprises subjecting to the action of heat a polyhydric alcohol in admixture with an oxide of a metal selected from the group consisting of alkali metals and alkaline earth metals, the metal radicle and the alcohol radicle being present in substantially the proportions which react to form a metal alcoholate, passing gaseous hydrogen chloride into the reaction mixture while the said reaction mixture is being heated, and removing the cyclic ether as it is formed.

2. Process for the manufacture of a cyclic ether, which comprises subjecting to the action of heat at a temperature of at least 160° C. glycerol together with an oxide of a metal selected from the group consisting of alkali metals and alkaline earth metals, the metal radicle being present in substantially the proportions which react to form the metal alcoholate in which all the hydrogen atoms attached to the hydroxyl groups of the polyhydric alcohols have been substituted by metal atoms, passing gaseous hydrogen chloride into the reaction mixture while the said reaction mixture is being heated, and continuously removing the cyclic ether as it is formed.

3. Process for the manufacture of a cyclic ether, which comprises subjecting to the action of heat at a temperature of at least 160° C. a glycol together with an oxide of a metal selected from the group consisting of alkali metals and alkaline earth metals, the metal radicle and the alcohol radicle being present in substantially the proportions which react to form the metal alcoholate in which all the hydrogen atoms attached to the hydroxyl groups of the polyhydric alcohols have been substituted by metal atoms, passing gaseous hydrogen chloride into the reaction mixture while the said reaction mixture is being heated, and continuously removing the cyclic ether as it is formed.

4. Process for the manufacture of a cyclic ether, which comprises subjecting to the action of heat at temperatures of 160 to 300° C. a glycol together with an oxide of a metal selected from the group consisting of alkali metals and alkaline earth metals, the metal radicle and the alcohol radicle being present in substantially the proportions which react to form the metal alcoholate in which all the hydrogen atoms attached to the hydroxyl groups of the polyhydric alcohols have been substituted by metal atoms, passing gaseous hydrogen chloride into the reaction mixture while the said reaction mixture is being heated, and continuously removing the cyclic ether as it is formed.

5. Process for the manufacture of a cyclic ether, which comprises subjecting to the action of heat at temperatures of 160 to 300° C. glycerol together with an oxide of a metal selected from the group consisting of alkali metals and alkaline earth metals, the metal radicle and the alcohol radicle being present in substantially the proportions which react to form the metal alcoholate in which all the hydrogen atoms attached to the hydroxyl groups of the polyhydric alcohols have been substituted by metal atoms, passing gaseous hydrogen chloride into the reaction mixture while the said reaction mixture is being heated, and continuously removing the cyclic ether as it is formed.

6. Process for the manufacture of diglycerol triether, which comprises subjecting to the action of heat glycerol together with an oxide of a metal selected from the group consisting of alkali metals and alkaline earth metals, the metal radicle and the alcohol radicle being present in substantially the proportions which react to form the metal alcoholate in which all the hydrogen atoms attached to the hydroxyl groups of the polyhydric alcohols have been substituted by metal atoms, passing gaseous hydrogen chloride into the reaction mixture while the said reaction mixture is being heated, and continuously removing the glycerol triether as it is formed.

7. Process for the manufacture of dioxane, which comprises subjecting to the action of heat ethylene glycol together with an oxide of a metal selected from the group consisting of alkali metals and alkaline earth metals, the metal radicle and the alcohol radicle being present in substantially the proportions which react to form the metal alcoholate in which all the hydrogen atoms attached to the hydroxyl groups of the polyhydric alcohols have been substituted by metal atoms, passing gaseous hydrogen chloride into the reaction mixture while the said reaction mixture is being heated, and continuously removing the dioxane as it is formed.

HENRY DREYFUS.